US012242086B2

United States Patent
Cromer et al.

(10) Patent No.: US 12,242,086 B2
(45) Date of Patent: Mar. 4, 2025

(54) HIGH SPECTRAL UNIFORMITY ACRYLIC LIGHT DIFFUSION MATERIAL

(71) Applicant: Trinseo Europe GmbH, Pfaeffikon (CH)

(72) Inventors: Brian M. Cromer, Royersford, PA (US); Jack J. Reilly, Blue Bell, PA (US)

(73) Assignee: Trinseo Europe GmbH, Pfaeffikon (CH)

( * ) Notice: Subject to any disclaimer, the term of this patent is extended or adjusted under 35 U.S.C. 154(b) by 0 days.

(21) Appl. No.: 18/667,661

(22) Filed: May 17, 2024

(65) Prior Publication Data
US 2025/0020835 A1    Jan. 16, 2025

Related U.S. Application Data

(63) Continuation of application No. 17/787,353, filed as application No. PCT/US2020/064976 on Dec. 15, 2020, now abandoned.
(Continued)

(51) Int. Cl.
*G02B 5/02*    (2006.01)
*F21V 3/06*    (2018.01)

(52) U.S. Cl.
CPC .............. *G02B 5/0242* (2013.01); *F21V 3/06* (2018.02); *G02B 5/0278* (2013.01)

(58) Field of Classification Search
CPC .... G02B 5/021; G02B 5/0215; G02B 5/0221; G02B 5/0226; G02B 5/0205; G02B 5/0242; F21V 3/0625
(Continued)

(56) References Cited

U.S. PATENT DOCUMENTS 5,969,039 A    10/1999    Kobayashi et al.
7,407,998 B2    8/2008    Yang et al.
(Continued)

FOREIGN PATENT DOCUMENTS

EP    1116741 A2    7/2001
JP    2000186148 A    7/2000
(Continued)

OTHER PUBLICATIONS

International Search Report and Written Opinion for International Application No. PCT/US2020/064976, dated Feb. 25, 2021, 9 pages.
(Continued)

*Primary Examiner* — Christopher M Raabe
(74) *Attorney, Agent, or Firm* — Buchanan Ingersoll & Rooney PC (57) ABSTRACT

The invention relates to an acrylic light diffusing material providing spectral uniformity over the visible light range, defined herein as from 400 to 800 nm. The light diffusing material provides a uniform light transmission for light engines having two or more light sources with different spectral emission peaks. Due to its high hiding performance, the light diffusing material of the invention is especially useful with LED point light sources. The diffusing material contains a transparent polymer matrix and one or more types of diffusing materials, providing an optimal balance of spectral uniformity, light transmission, diffusion, and hiding performance.

15 Claims, 2 Drawing Sheets

Light Transmission vs wavelength for acrylic resins containing silicone diffusion beads (Particle D) and acrylic styrenic diffusion beads (Particle B)

Related U.S. Application Data (60) Provisional application No. 62/951,248, filed on Dec. 20, 2019.

(58) Field of Classification Search
USPC .......................................................... 362/351
See application file for complete search history.

(56) References Cited

U.S. PATENT DOCUMENTS

| | | |
|---|---|---|
| 7,547,736 B2 | 6/2009 | Yang et al. |
| 8,163,827 B2 | 4/2012 | Garcia-Leiner et al. |
| 8,609,011 B2 | 12/2013 | Hoess et al. |
| 9,333,274 B2 | 5/2016 | Peterson et al. |
| 9,482,406 B2 * | 11/2016 | Merrow .................. F21L 4/00 |
| 11,589,518 B2 | 2/2023 | Cromer |
| 2008/0113117 A1 | 5/2008 | Coenjarts et al. |
| 2014/0071695 A1 | 3/2014 | Chen et al. |
| 2015/0267891 A1 | 9/2015 | Burchill et al. |
| 2016/0245954 A1 | 8/2016 | Ge et al. |
| 2016/0245963 A1 | 8/2016 | Ge et al. |
| 2017/0123116 A1 | 5/2017 | Ge et al. |
| 2018/0052260 A1 | 2/2018 | Ge et al. |
| 2021/0386023 A1 | 12/2021 | Cromer |
| 2023/0110105 A1 | 4/2023 | Tombolato |

FOREIGN PATENT DOCUMENTS

| | | |
|---|---|---|
| JP | 6307940 B2 | 4/2018 |
| WO | 2006100126 A2 | 9/2006 |
| WO | 2020081780 A1 | 4/2020 |
| WO | 2020198179 A1 | 10/2020 |

OTHER PUBLICATIONS

The extended European Search Report issued Dec. 14, 2023, by the European Patent Office in corresponding European Patent Application No. 20902763.0-1020. (7 pages).

\* cited by examiner

Figure 1: Light Transmission vs wavelength for acrylic resins containing silicone diffusion beads (Particle D) and acrylic styrenic diffusion beads (Particle B)

Figure 2: Hiding Performance vs wavelength for acrylic resins containing silicone diffusion beads (Particle D) and acrylic styrenic diffusion beads (Particle B)

Figure 3: Light Transmission vs wavelength for acrylic resins containing silicone diffusion beads (Particle D) and Styrene Acrylic diffusion beads (Particle A)

Figure 4: Hiding Performance vs wavelength for acrylic resins containing silicone diffusion beads (Particle D) and acrylic styrenic diffusion beads (Particle A).

HIGH SPECTRAL UNIFORMITY ACRYLIC LIGHT DIFFUSION MATERIAL

CROSS-REFERENCE TO RELATED APPLICATIONS

This is a continuation application of U.S. application Ser. No. 17/787,353, filed Dec. 15, 2020, which is the 371 filing of International Application No. PCT/US2020/064976, filed Dec. 15, 2020, which claims the benefit of U.S. Provisional Application No. 62/951,248 filed Dec. 20, 2019, the disclosures of these applications being incorporated herein by reference in their entireties for all purposes.

FIELD OF THE INVENTION

The invention relates to an acrylic light diffusing material providing spectral uniformity over the visible light range, defined herein as from 400 to 800 nm. The light diffusing material provides a uniform light transmission for light engines having two or more light sources with different spectral emission peaks. Due to its high hiding performance, the light diffusing material of the invention is especially useful with LED point light sources. The diffusing material contains a transparent polymer matrix and one or more types of diffusing materials, providing an optimal balance of spectral uniformity, light transmission, diffusion, and hiding performance.

BACKGROUND OF THE INVENTION

Light transmission and diffusion can be managed through the use of diffusion particles-both inorganic and organic in a polymer matrix. For example, U.S. Pat. No. 7,547,736 describes the use of particles having an average particle size of 15 to 70 microns to provide a frosted look and textured surface, and U.S. Pat. No. 8,163,827 describes a high light transmission diffusion screen having inorganic pigments and refractive index-matched particles.

Luminous devices consist of a light source and a cover (also called a lens or a diffuser) made of a plastic whose function is to mask and protect the light source, while still ensuring good transmission of the light emitted by the light source. The plastic may be colored or may have decorative elements or patterns. The cover also has the function of scattering the emitted light so that the illumination is softened and not dazzling. The scattering of the light emitted by the light source is achieved by dispersing scattering particles of organic or mineral nature in the plastic.

Light emitting diodes (LEDs) are being increasingly favored as a light source, since they use far less electricity and produce less heat than standard incandescent or fluorescent light bulbs. LEDs provide a very bright, point light source, yet the output often appears harsh and causes an uncomfortable glare. This is a challenge for lighting designers, as many applications demand an illumination and low glare. There is often a desire to hide the light source shape, creating a more diffuse lighting.

Replacing a conventional light source with an LED results in a modification of the illumination. This is because an LED, especially an LED having a high luminous flux, exhibits directional illumination, whereas, for example the illumination of a neon tube is from 0 to 360°. In addition, the emission spectrum of an LED is completely different from that of a conventional light source.

WO 2006/100126 describes a thermoplastic cover with dispersed beads for use with LEDs to form luminous devices. 3-30% of scattering particles are dispersed in a transparent plastic. The particles can be inorganic or organic and have mean diameters of from 0.5 to 100 microns. There is no description of combinations of particle size and loading, and no teaching of hiding performance.

The addition of scattering particles helps to soften the effect of the LED light source, but the scattering also reduces light transmission. Some LED lighting cover manufacturers add pigments, such as $BaSO_4$, to the cover to increase the hiding performance, though this can dramatically decrease the light transmission.

The hiding performance of an LED covering is generally measured by the industry in a qualitative manner. A quantitative haze measurement is sometimes used as a surrogate, but it does not adequately correlate to the hiding performance. Applicant has developed a quantitative hiding method, as described in US 2015/0267891, incorporated herein by reference.

There are currently several commercial acrylic light diffusion materials, comprising spherical plastic particles dispersed within an acrylic matrix. Nearly all commercial acrylic/PMMA products contain additives that block UV light (200-400 nm) in order to increase safety for human exposure, the intended application of current commercial acrylic light diffusion materials. Products exist without UVA blockers, but these products are neither meant for use with LED light, nor contain diffusing particles, such as PMMA sheet for tanning beds (U.S. Pat. No. 7,407,998).

Multiple LEDs are often used to take advantage of the different wavelength of light, and provide a wide spectrum of transmitted light.

Many diffusion sheets, particularly those containing organic light diffusion beads, demonstrate poor spectral uniformity. They typically exhibit a sharp drop off in transmission efficiency for wavelengths of light in the near-UV range (380-420 nm). Thus with typical diffusers, there is a significant loss of transmission for a lighting device having a light source in this lower range.

This is problematic for applications like Violet LED disinfection, which uses 405 nm light to disinfect surfaces. In this case, a diffusion resin with reduced % LT at 405 nm would reduce the efficiency of 405 nm LEDs.

U.S. Pat. No. 9,333,274 seeks to reduce the reflectance or transmissive properties to less than a 30% loss of energy in the 380 to 420 nm wavelength range.

There is a need for a diffusion material that can provide a high spectral uniformity for several different point light sources of different wavelengths, while also providing high light transmission, high diffusion and good hiding performance.

Surprisingly it has now been found that a 0.080" thick, diffusion cover having a transparent polymer matrix and 0.1 to 40 weight percent of diffusing particles, can be formed to provide a light transmission of greater than 40 percent and preferably greater than 60 percent at each of 400 nm, 500 nm, 600 nm, 700 nm and 800 nm, with less than a 6 percent absolute difference in light transmission between the 400 nm and 800 nm transmissions, while still providing a hiding performance of at least 65 percent at 400 nm, and preferably at each of these wavelengths.

Ideally the transmission at each of 400, 500, 600, 700, and 800 is at least 90%.

This material is useful for multi-spectral luminaire, which contain two or more light engines with multiple spectral emission peaks.

SUMMARY OF THE INVENTION

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The invention relates to a light diffusing cover composition for use with two or more point light sources, wherein said light diffusing cover composition comprises:
a) a transparent or translucent polymer matrix,
b) 0.1 to 40 weight percent, preferably from 0.2 to 20, and more preferably from 0.3 to 10 weight percent of diffusion particles dispersed within said transparent polymer matrix,
wherein said light diffusing cover composition has the following properties when measured on a 0.080 inch (0.203 cm) thick sheet:
a light transmission of greater than 40 percent, and preferably greater than 60 percent of light at each of 400 nm, 500 nm, 600 nm, 700 nm, and 800 nm light wavelengths;
less than a 6 percent absolute difference between the light transmission at 400 nm and the light transmission at 800 nm; and
a level of diffusion, as measured by hiding performance, of at least 65 percent at 400 nm, and preferably at 400 nm, 500 nm, 600 nm, 700 nm, and 800 nm light wavelengths.

The transparent or translucent polymer matrix in the light diffusing cover composition may be polymethylmethacrylate (PMMA), polycarbonate (PC), polyethylene terephthalate, glycol modified (PETG), polyvinyl chloride (PVC), impact modified PVC, polyesters (PET, PBT, APET, etc.), styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, and mixtures thereof.

The matrix polymer is preferably a (meth)acrylic polymer, having at least 70 weight percent of methylmethacrylate monomer units.

The diffusing particles in the light diffusing cover are inorganic, organic or a mixture thereof, may have a spherical, near spherical or irregular shape, and have a refractive index mis-match with the polymer matrix of +/−0.01 to 0.25, and may have a refractive index that is lower than the refractive index of the polymer matrix. The diffusion particles may have a multi-modal particle size distribution, and are preferably made of silicon resin, silicon rubber, or a mixture thereof.

The light diffusing cover composition may additionally contain impact modifiers, and may contain one or more types of UV absorbers. Preferably the composition contains less than 5 weight percent, less than 3 weight percent, less than 1 weight percent, and most preferably no UV absorbers that absorb wavelengths of light above 390 nm, based on the total composition.

The invention also relates to a lighting device having two or more point light sources of different wavelengths, and the light diffusing cover made of the light diffusing cover composition described in any of the aspects above.

The light diffusing cover may have a thickness of from 200 micrometers to 10 mm, and preferably has a roughened (textured) surface.

The light diffusing cover composition and lighting device described in the previous aspects, may find use in a continuous environmental disinfecting luminaire, a multi-color luminaire, a horticultural lighting luminaire, or an interior automotive lighting system.

DETAILED DESCRIPTION OF THE INVENTION

All references cited herein are incorporated by reference. Unless otherwise stated, all molecular weights are weight average molecular weights as determined by Gas Permeation Chromatography (GPC), and all percentages are percentage by weight.

The term "copolymer" as used herein indicates a polymer composed of two or more different monomer units, including two comonomers, terpolymers, and polymers having 3 or more different monomers. The copolymers may be random or block, may be heterogeneous or homogeneous, and may be synthesized by a batch, semi-batch or continuous process.

As used herein, "Point light source" means any shaped source of electromagnetic radiation in the 4,000-7,700 Angstrom range. This includes, but is not limited to, incandescent, fluorescent, neon, argon and LED light sources.

One of skill in the art would understand that the present application contains a description of exemplary embodiments only, and is not intended as limiting the broader aspects of the present disclosure.

Diffusing Cover

The diffusing cover of the invention is a transparent polymer matrix containing one or more types of diffusing particles. The diffusing cover of the invention provides an even spectral transmission over the wavelength range of from 400 to 800 nm. The even spectral transmission may also effectively extend to lower wavelength light, including down to 390 nm, 385 nm, and 375 nm. For example, a 405 peak nm LED source is known to produce light emission down to about 385 nm. Due to the uniform spectral transmission provided, the diffusing cover composition of the invention is useful for two or more different wavelength point light sources, and especially when one light source is in the 375 to 450 nm range, where light transmission for ordinary diffusing covers generally falls off significantly at the shorter wavelengths.

Polymer Matrix Composition

The diffusing cover matrix polymer is a thermoplastic or thermosetting polymeric material, having a light transmission in the range of from 350 to 1000 nm of at least 50%, preferably at least 70%, more preferably at least 80%, and even more preferably greater than 90%, according to ASTM D 1003 standard (this is the light transmission of the polymer with no scattering particle). The matrix may be transparent or translucent. A translucent glazing can help with light scattering, and so is preferred. The translucency can be caused by a physical treatment of the glazing surface, or by the addition of particles, and in particular of particles with a mis-match of refractive index of from 0.01 to 0.25, and more preferably from 0.02 to 0.2, plus or minus.

Useful polymer matrix materials include, but are not limited to, polycarbonate (PC), polyethylene terephthalate, glycol modified (PETG), polyvinyl chloride (PVC), impact modified PVC, polyesters (PET, PBT, APET, etc.), styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, etc., or mixtures thereof. Useful thermoset polymer matrices include, but are not limited to silicones and epoxides.

Acrylics, polystyrene, styrene acrylonitrile and polycarbonate are the preferred polymer matrices due to their ease of processing, and commercial availability. In addition, these polymers exhibit excellent thermomechanical strength. While the energy efficiency of an LED is much better than for an incandescent lamp, some of the energy is nevertheless converted into heat.

Acrylic polymers, as used herein, are meant to include polymers, and copolymers having two or more different monomer units that are formed from alkyl methacrylate and alkyl acrylate monomers, and mixtures thereof. The alkyl methacrylate monomer is preferably methyl methacrylate, which may make up from greater than 50 to 100 percent of the monomer mixture. 0 to less than 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. Most preferably, the acrylic polymer is a copolymer having 70-99.5 weight percent and more preferably 80 to 99 percent of methyl methacrylate units and from 0.5 to 30 weight percent of one or more $C_{1-8}$ straight or branched alkyl acrylate units.

The acrylic polymer can be an alloy with one or more compatible polymers. Preferred alloys are PMMA/polyvinylidene fluoride (PVDF) alloys, and PMMA/polylactic acid (PLA) alloys. The alloy contains 2 to 95 weight percent, preferably 5 to 90 weight percent, more preferably 20-90, and more preferably 51-90 weight percent of the PMMA homopolymer or copolymer, and 5 to 98 weight percent, preferably 10 to 95 weight percent, more preferably 10 to 80 weight, and more preferably 10 to 49 percent of the compatible polymer.

Diffusing Particles

The diffusing particles may be organic, inorganic or a mixture thereof, and may be spherical, near-spherical, or irregular shaped—or mixtures thereof. Particles formed from suspension or emulsion synthesis are relatively spherical. Particles formed from the grinding of cell-cast sheet will be irregular. In one embodiment particles are formed from the grinding of cell-cast sheet and have irregular shapes. The irregular shape can aid in light dispersion. The diffusing particles maintain their shape and resist deformation under normal processing conditions of heat and pressure during incorporation into the polymer matrix and subsequent formation into articles.

The diffusing particles have an average particle size generally in the range of 500 nm to 120 micrometers, and preferably in the range of 1 micrometer to 90 micrometers. The most preferred particle size range is from 1.5 to 5 micrometers for a unimodal distribution. The distribution could also be bimodal or multimodal. One useful bi-modal distribution includes 1 to 20, and preferably 2 to 15 equivalent loading weight percent of small cross-linked diffusing particles having a mean particle size of from 1 to 20 microns, and from 2 to 10 equivalent loading percent by weight of large cross-linked diffusing particles having a mean particle size of from 30 to 80 microns. This bimodal distribution produces a textured surface, in addition to providing good hiding performance, good transmission and good diffusion.

The amount of the diffusing particles in the polymer matrix ranges from 0.1 to 40 weight percent, based on the weight of the total glazing, preferably from 0.2 to 20 percent, and more preferably from 0.2 to 10 percent, and most preferably from 0.3 to 10, and more preferably from 0.4 to 6 weight percent, based on the total polymer matrix composition. The level of total diffusing particles can depend on the average particle size, and also on the thickness of the glazing. The particles preferably do not absorb 350-400 nm light.

The particles have a refractive index that is mismatched to the matrix, having a refractive index that is 0.01 to 0.25 different from that of the matrix polymer, preferably from 0.02 to 0.20. While not being bound by any particular theory, it is believed that diffusion particles with refractive index lower than the polymer matrix are most preferred for maximum spectral uniformity of the light transmitted through a diffusion material. It is believed that diffusion materials containing diffusion particles with refractive index lower than the matrix will incur less Fresnel reflection losses, compared to diffusion materials containing diffusion particles with refractive index higher than the matrix. While not being bound by any particular theory, it is believed that additives or processes that increase the roughness of the diffusing material surface are preferred for maximum spectral uniformity of the light transmitted through a diffusion material. Index of refraction can be measured by methods well known in the art such as in conformance with ASTM D 542. Since different sized particles diffuse light most efficiently at specific wavelengths, in order to provide good diffusing over the range from 400 nm to 800 nm of light two or more different average particle size distributions are preferably used- or else a single average particle size with a very, very wide distribution of particle. Smaller size diffusing particle may be better at diffusing shorter wavelength light, and larger average particle size particles may be better at diffusing longer wavelength light.

Examples of useful particles include inorganic particles such as $BaSO_4$, $TiO_2$, $CaCO_3$, $BaTiO_3$, fluoropolymer particles such as poly(tetrafluoroethylene) (PTFE), poly(chlorotrifluoroethylene) (PCTFE), poly(vinylidene fluoride) (PVDF), ethylene chlorotrifluoroethylene (ECTFE), and copolymers thereof; hydrophobic polymers such as polyalkyl oxides; polystyrene; silicones including but not limited to silicone rubbers, oligosiloxane-type cage link structures and silicone resins; core/shell polymer particles; cross-linked acrylic beads, preferably made by a suspension process having a composition of 0-99.99% styrene, 0-99.99% alkyl methacrylate or alkyl acrylate, or a mixture of both, and 0.01-5% crosslinking agent.

In one embodiment, cross-linked methyl methacrylate particles are used. These comprise greater than 50 weight percent, preferably greater than 70 weight percent, and more preferably greater than 80 weight percent methyl methacrylate units and 0.5 to 20 percent, preferably 1 to 10 percent, of a monomer possessing at least two C=C double bonds acting as crosslinking agent. This may for example be 1,4-butanediol di(meth)acrylate, ethylene glycol di(meth)acrylate, tetraethylene glycol di(meth)acrylate, propylene glycol di(meth)acrylate, pentaerythritol tetra(meth)acrylate, allyl methacrylate or divinylbenzene. In another embodiment, acrylic copolymers containing a majority of butyl acrylate are used.

In another embodiment, the particles have a core-shell structure with rubbery alkyl acrylate polymers in the core and at least one polymer shell, which is compatible to the polymer matrix. This outer shell represents only a fraction of the total particle weight. The rubbery core typically comprises an alkyl acrylate polymer having a refractive index that differs by at least 0.02 or more units from that of the matrix polymer.

In a preferred embodiment, some or all of the diffusing particles are silicon-both silicon rubber and silicone resin particles. Silicon particles useful in the invention may be obtained in several ways, including: A: Hydrolysis and polycondensation of organotrialkoxysilanes and/or tetraalkoxysilanes, these being described by the formulae $R^1Si(OR^2)_3$ and $Si(OR_2)_4$, where R' is, by way of example, a substituted or unsubstituted alkyl group, an alkenyl group or a phenyl group, and the radical R of the hydrolysable alkoxy group is an alkyl group, such as methyl, ethyl or butyl, or an alkoxy-substituted hydrocarbon group, e.g. 2-methoxyethyl or 3-ethoxyethyl. Examples of organotrialkoxysilanes are methyltrimethoxysilane, methyltriethoxysilane, methyl-n-propoxysilane, methyltriisopropoxysilane and methyltrls (2-methoxyethoxy) silane. These silane compounds, and processes for the production of spherical silicone particles therefrom, are known to the person skilled in the art and can be found in the specifications EP 1 116 741, JP 63-077940 and JP 2000-186148. B: Chemical crosslinking of polysiloxane chains having inorganic silicone-oxygen backbone and organic side chains amenable to chemical crosslinking, such as olefinic groups. For example, U.S. Pat. No. 5,969,039 demonstrates such a process.

The silicon-containing diffusing particles may be used as the sole diffusing particles, or can be combined with other types of organic and/or inorganic particles. In the examples that follow, the silicon particles show similar performance when combined with large organic particles.

Other Additives

The polymer matrix composition may contain other additives, including impact modifiers, and other additives typically present in polymer formulations, including but not limited to, stabilizers, plasticizers, fillers, coloring agents, pigments, dyes, antioxidants, antistatic agents, surfactants, toner, refractive index matching additives, additives with specific light diffraction.

Useful impact modifiers include block copolymers, graft copolymers, and core/shell impact modifiers. The impact modifier may be present at a level of from 0 to 80 weight percent, preferably 5 to 60, and more preferably from 10 to 45 weight percent, based on the total layer amount of matrix polymer and all additives. The level of impact modifier can be adjusted to meet the toughness needs for the end use of the composition. Core-shell impact modifiers are multi-stage, sequentially-produced polymer having a core/shell particle structure of at least two layers. Preferentially, the core-shell modifier comprises three layers made of a hard core layer, one or more intermediate elastomeric layers, and a hard shell layer.

In one embodiment, the impact modifier comprises a core made of acrylate/polysiloxane copolymer and a shell made of hard resin. In this case, the core is a material of flexible rubber type prepared by polymerization of one or more vinyl monomers in the presence of a polymer of rubber type obtained from monomers such as alkyl acrylates or alkyl methacrylates, in which the alkyl group comprises from 2 to 10 carbon atoms. Products of this type are sold by Mitsubishi Rayon under the reference Metablen® S-2001.

According to another embodiment, the impact modifier is composed of a poly(organosiloxane) core and of a shell of thermoplastic resin. The organic groups of the poly(organosiloxane) cores are preferably alkyl or vinyl radicals comprising between 1 and 18 carbons, advantageously between 1 and 6 carbons, or aryl radicals or hydrocarbons which are substituted. The poly(organosiloxane) comprises one or more of these groups. The siloxanes have a variable degree of functionalization which defines the degree of crosslinking of the poly(organosiloxane). Preferably, the mean degree of functionalization is between 2 and 3, thus forming a partially crosslinked core. The shell is formed of polymers or copolymers resulting from monomers such as alkyl acrylates or methacrylates, acrylonitrile, styrene, vinylstyrene, vinyl propionate, maleimide, vinyl chloride, ethylene, butadiene, isoprene and chloroprene. The fraction of the core represents between 0.05 and 90% by weight of the particles, preferably between 60 and 80% by weight. The size of the particles is between 10 and 400 nm. Mention may be made, as example of impact modifier of this type, of the products of the Genioperl® range from Wacker Silicones.

In one embodiment, the impact modifier is a high efficiency impact modifier, as described in WO 2020/198,179, having 0.5 to 40 weight percent, of a hard core polymeric stage with a $T_g>0°$ C., 10 to 80 weight percent, of an inner polymeric shell with a $T_g<0°$ C., 5-50 weight percent, of an outer polymeric shell with a $T_g>0°$ C., wherein the ratio of emulsifier to surface area of said core-shell particle is less than $1.5\times10^{-4}$ $g/m^2$.

Light Stabilizing and/or UV absorbing additives may be added to the polymer matrix composition, though any such light stabilizing or UV absorbing additive should not interfere with 400 nm light transmission. UV light stabilizers include both UV absorbers and antioxidants. The specific selection of a UV absorber and the loading level can control the Δ% LT. Lower loading of light stabilizing or UV absorbing additives and the choice of such additive(s) that only absorb at lower wavelengths (such as 250-360 nm) should be used in the composition of the invention. Some typical UV absorbers, such as Methyl Salicylate (MESAL) absorbs slightly up to 390 nm. Useful UV absorbers that absorb UVB and UVC light (200-320 nm light) include but are not limited to, phenolic aldehydes (e.g. Methyl Salicylate or N-(2-Ethoxyphenyl)-N'-(2-ethylphenyl) oxamide) and/or dimethyl (P-methoxybenzylidene) malonate (e.g. Hostavin PR-25). Useful light stabilizing additives include but are not limited to Hindered Amine light stabilizers (e.g. Tinuvin 770), and may provide an additional radical scavenging and/or antioxidant effect.

Some commercial light stabilization additives (e.g. Tinuvin® P) exhibit minor absorbance in the visible region of the electromagnetic spectrum (>380 nm). If such additives are included in a light diffusing acrylic resin, spectral uniformity may diminish (increase ΔLT (800-400 nm)). It is known to those skilled in the art that alternative commercially available light stabilization additives (e.g. Tinuvin® 312) do not exhibit absorbance in the visible region (>380 nm), and are therefore preferred in a light diffusing acrylic formulation to improve spectral uniformity (decrease ΔLT (800-400 nm)). For example, Examples 10 and 14-18 show that judicious selection of UV absorber and UV absorber concentration may improve spectral uniformity.

Blending Procedure

The diffusing cover of the invention may be blended and formed by any process known in the art for forming a cover, including but not limited to melt compounding and melt processing, such as extrusion, blow molding, injection molding, etc. or in a cast polymerization process.

The diffusing cover of the invention is at least 200 micrometers in thickness, with no limitation on the maximum thickness—other than the increase in cost and weight. A preferred thickness is from 250 microns to 10 mm, and more preferably from 300 micrometers to 5 mm in thickness.

Coating

In one embodiment, the diffusing cover of the invention may be coated, to provide added properties to the cover, such as dirt shedding and weathering. Useful dirt shedding coatings may include fluoropolymers, including polyvinylidene fluoride polymers and copolymers having at least 60 weight percent of polyvinylidene fluoride monomer units; silicon coatings, cross-linked acrylic coatings, and other coating known in the art for improving dirt shedding and weathering properties. The coating should not generally interfere with the transmission of light in the 400 nm-800 nm range. The coating may be added by a coating process, a coextrusion process, a lamination process, or other processes known in the art.

Light Sources

The light diffusing cover of the invention is especially useful when used in a lighting device having more than one, point light source. Multi-spectral LED devices or luminaires are devices that contain at least one LED with peak spectral emission in the visible light spectrum (400-800 nm) and at least one additional LED with different peak spectral transmission in the range 250-800 nm. Examples include:

1: Continuous Environmental Disinfecting Luminaires. Luminaires such as the CM2084-D-JASPER™ by Visa Lighting contain multiple LEDs with different peak emission in order to selectively disinfect a surface, and or provide light to humans. In this case, LEDs with peak emission at 405 nm may be activated to disinfect a surface while LEDs with peak emission at 500-700 provide soft-white light for visibility.

2: Multi-color Luminaires. Commercial products and smart lighting, such as light strips from Philips include multiple LEDs enchased within a diffusing housing in order to provide color-tuneability to the user.

3: Horticultural Lighting. Some crop growers use multi-spectral LED luminaires to influence crop development and health. For example, LEDs with peak spectral emission above 700 nm have been shown to influence phototropism in plants, while LEDs with peak spectral emission below 400 nm have been used to promote production of plant flavonoids and phenyl propanoids. Commercial luminaires contain 4-10 LED types with different spectral emission peak.

For multi-spectral luminaire applications that wholly or partially involve human exposure, it is preferable that the LED light engine is placed behind a diffusing material in order to reduce glare. It is also preferable that the diffusing material uniformly transmit light across the entire visible spectrum in order to maximize light transmission from each LED through the diffusing material.

4. Interior automotive lighting having various color LEDs. One application is for the interior of autonomous vehicles.

EXAMPLES

Refractive Index (R.I.) measured by ASTM D 542 (Na-D line@ 23° C.

Number average particle diameter: measured by Laser Diffraction Particle Size Analysis using a Malvern Multisizer II (Electrical Sensing Zone Method, reporting mean particle size.

Hiding Performance

The hiding performance (HP) of the LED cover of the invention can be determined by a test comprising the steps of:

a) forming plaque of the material to be tested at uniform thickness—for example 0.080 inch thickness;
b) measuring the optical transmission of the sample on a Perkin Elmer Lambda 950 at 0 inches from the integrating sphere, and 400 nm, 500 nm, 600 nm, 700 nm, and 800 nm light;
c) measuring the optical transmission of the sample on a Perkin Elmer Lambda 950 at 2 inches from the integrating sphere, and 400 nm, 500 nm, 600 nm, 700 nm, and 800 nm light;
d) calculating the percent hiding performance as a percentage, as the difference between the two transmission measurements (0 inch and 2 inch), divided by the 0 inch transmission measurement, times 100 to obtain a percent hiding performance each of 400 nm, 500 nm, 600 nm, 700 nm, and 800 nm light.

Hiding performance is somewhat related to haze, yet for many samples haze does not correlate well to hiding performance. In general, the lighting industry relies on qualitative tests that vary from manufacturer to manufacturer, such as by ASTM D 1003. In a commercial extruded lens or cover (2 mm thickness) the hiding performance should be greater than 40% and preferably greater than 50%, and not more than 95%. Below 30% light is not efficiently diffused at a reasonable distance (2 inch). Above 95% and the percent transmission of the lens is compromised, lowering the light output. In the thinner lens 0.9 mm (injection molded) the hiding performance should also be greater than 40%

It has been found that the transmission curves are a function of the distance from the integrating sphere on a Perkin Elmer Lambda 950. Yet the change in the light transmission as a result of the distance from the integrating sphere is not constant for different materials. Calculation of hiding performance is found to be a function of distance from integrating sphere.

Test: First a 2 inch by 2 inch square, 0.080 in thickness is extruded for each composition. The sample is placed in a Perkin Elmer Lambda 950 at 0 inches from the integrating sphere, and the transmission at 400 nm, 500 nm, 600 nm, 70 nm, and 800 nm light is measured. The sample is then moved to 2 inches from the integrating sphere, and the transmission at 400 nm, 500 nm, 600 nm, 70 nm, and 800 nm light is again measured. The hiding performance is then calculated as the difference between the two transmission measurements (0 inch and 2 inch), divided by the 0 inch transmission measurement, times 100 to obtain a percent hiding performance at each wavelength.

Example Formulations

Diffusion material samples were obtained by melt compounding the components described in Table 2, followed by sheet extrusion of 0.080" thick sample plaques. The compounding die temperature was controlled at 200-220° C. using a Leistritz 27 mm twin screw extruder under vacuum at the line speed of 50 lbs/hr under the screw speed of 250-350 rpm. Optical Characterization was performed on a Lambda 950 UV/VIS Spectrophotometer. Light transmission (% LT) and Hiding Performance (HP) were calculated according to methods described above. Examples 1-13 are extruded and may exhibit some texturing due to the particles, while Examples 14-18 are injection molded in a highly polished mold.

Resin A is poly(methyl-methacrylate)/ethyl acrylate copolymer, MFR 2.3 g/10 min (measured by ASTM D1238, 230° C./3.8 kg) and refractive index 1.489 (measured according to ASTM D 542). Resin A does not contain UV absorbing additives. Table 1 summarizes the diffusing particle characteristics.

TABLE 1

Diffusion particles used in examples. Refractive indices measured according to ASTM D 542

| ID | Description | Number Average Diameter (μm) | Refractive Index |
|---|---|---|---|
| Particle A | Acrylic and Styrenic bead | 50.0 | 1.515 |
| Particle B | Acrylic and Styrenic bead | 5.0 | 1.555 |
| Particle C | Silicone bead A | 2.0 | 1.39 |
| Particle D | Silicone bead B | 2.2 | 1.42 |

TABLE 2

Example formulations expressed in weight percent.

| | Resin A | Particle A | Particle B | Particle C | Particle D |
|---|---|---|---|---|---|
| Example 1 | 82.0% | 18.0% | 0.0% | 0.0% | 0.0% |
| Example 2 | 99.5% | 0.0% | 0.5% | 0.0% | 0.0% |
| Example 3 | 99.7% | 0.0% | 0.0% | 0.0% | 0.3% |
| Example 4 | 99.4% | 0.0% | 0.0% | 0.6% | 0.0% |
| Example 5 | 99.4% | 0.0% | 0.0% | 0.0% | 0.6% |
| Example 6 | 99.0% | 0.0% | 1.0% | 0.0% | 0.0% |
| Example 7 | 98.5% | 0.0% | 1.5% | 0.0% | 0.0% |

TABLE 3

| | 400 nm | | 800 nm | | Δ% LT |
|---|---|---|---|---|---|
| Example ID | % LT | HP | % LT | HP | (800 nm − 400 nm) |
| Example 1 | 82.2 | 88% | 89.5 | 77% | 7.3 |
| Example 2 | 84.2 | 80% | 90.2 | 66% | 6.0 |
| Example 3 | 81.8 | 91% | 85.8 | 85% | 4.0 |
| Example 4 | 69.5 | 93% | 75.0 | 89% | 5.6 |
| Example 5 | 74.9 | 92% | 79.0 | 89% | 4.1 |
| Example 6 | 73.6 | 90% | 85.7 | 82% | 12.1 |
| Example 7 | 64.2 | 93% | 79.7 | 88% | 15.5 |

Summarized optical light transmission (% LT), hiding performance (HP), and spectral uniformity (Δ% LT) of 0.080" thick example plaques, measured on a Lambda 950 UV/VIS Spectrophotometer.

Examples 1-7

This example compares acrylic light diffusion materials containing silicone-diffusion particles with commercial acrylic light diffusion materials containing organic diffusion particles. The silicon-containing diffusing particles were found to provide more uniform spectral transmission at equal or better hiding performance.

The percent light transmission (% LT), and or hiding performance vs. wavelength are shown for different levels of diffusing particles in FIGS. 1-4.

Spectral uniformity is defined as the difference % LT (800 nm)-% LT (400 nm).

The spectral uniformity for each sample is listed in Table 3. Only acrylic resins containing silicone resin (Particle D) or silicone rubber (Particle C) diffusion particles demonstrate spectral uniformity of less than 6%. It is anticipated that a person skilled in the art may achieve spectral uniformity with less than 6% using an exceedingly small concentration of any diffusion particles, however the hiding performance will be very low. Both Particle C and Particle D have refractive index lower than the Resin A matrix. When considering the light transmission through a diffusing material, it is believed that a diffusing material containing diffusion particles with refractive index lower than the refractive index of the matrix is best for promoting uniform spectral transmission.

Figure 1:
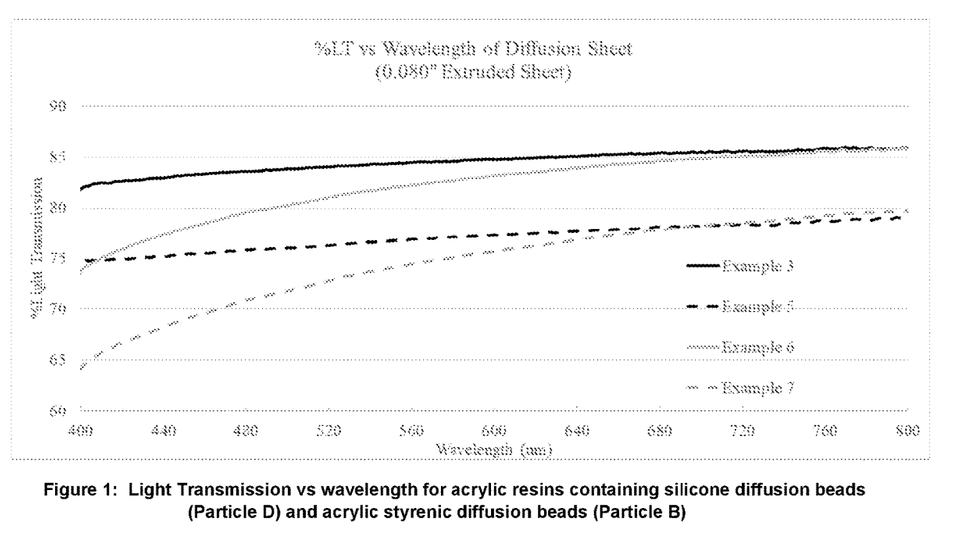
FIG. 1 compares the % light transmission versus wavelength for an acrylic resin containing silicone diffusion beads (Particle D) and acrylic styrenic diffusion beads (Particle B).
Figure 2:
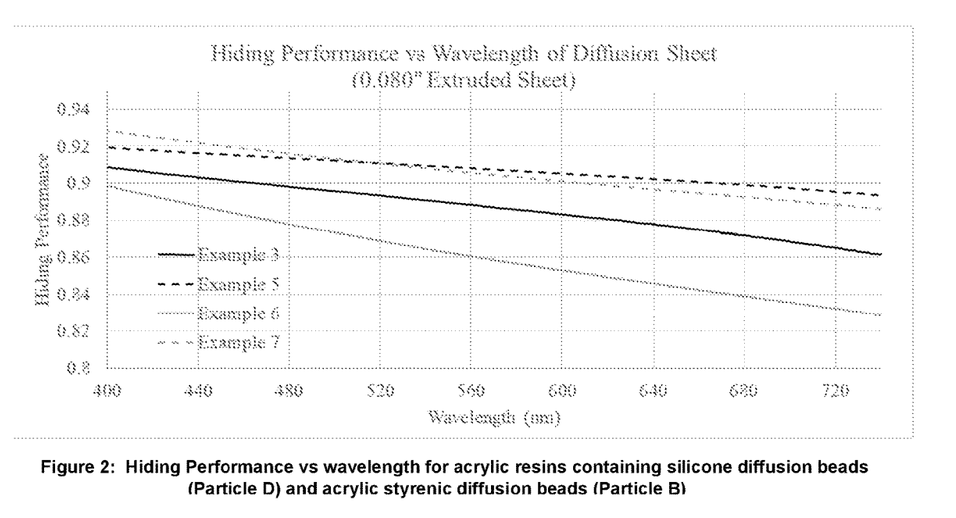
FIG. 2 compares the hiding performance versus wavelength for the above resins and diffusing particles.

FIG. 1 compares acrylic resin containing Particle D to Particle B. At 800 nm, the light transmission for 0.6% and 0.3% Particle D is equivalent to 1% and 1.5% Particle B, respectively. At 400 nm, the light transmission for 0.6% and 0.3% Particle D is up to 10% greater than 1% and 1.5% Particle B, respectively. Accordingly, compositions containing Particle D demonstrate greater spectral uniformity and provide equal or better hiding performance (FIG. 2).

Figure 3:
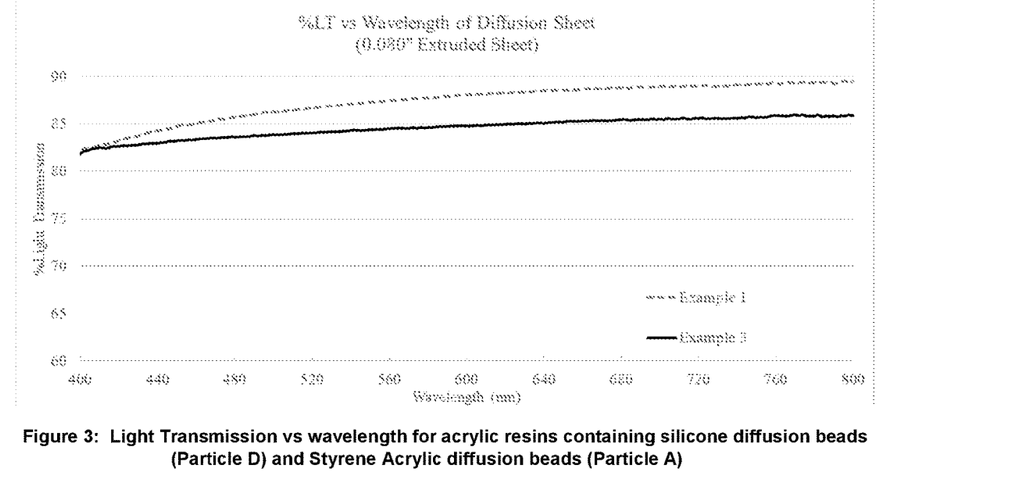
FIG. 3 compares the % light transmission versus wavelength for acrylic resins containing silicone diffusion beads (Particle D) and styrene acrylic diffusion beads (Particle A).
Figure 4:
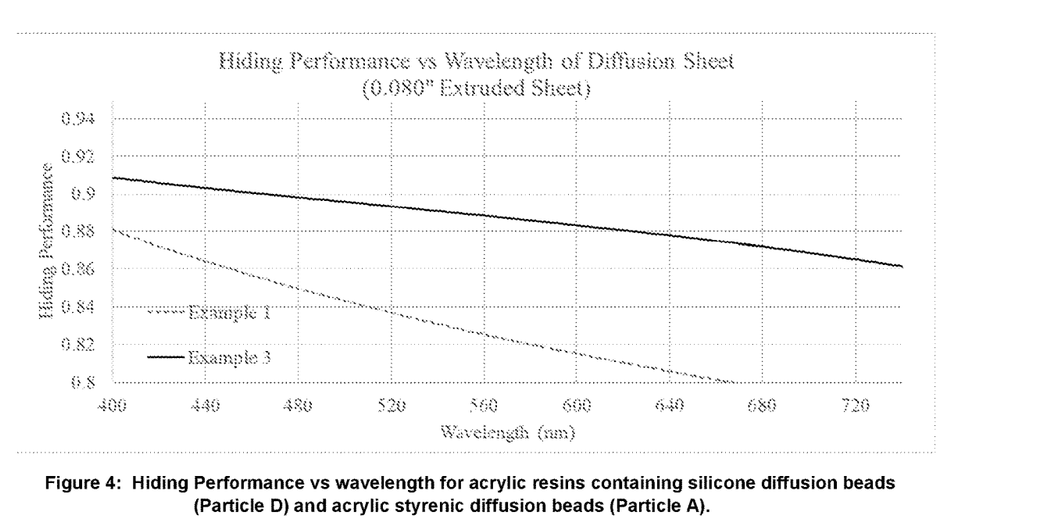
FIG. 4 is a plot of the hiding performance versus wavelength for acrylic resins containing silicone diffusion beads (Particle D) and acrylic styrenic diffusion beads (Particle A).

Table 3 shows diffusion resins containing Particle D also demonstrate better spectral uniformity than diffusion resins containing Particle A (FIG. 3). While both resins have the same % LT at 400 nm. The diffusion resins containing Particle A demonstrates poor spectral uniformity compared to the acrylic resin containing Particle D. Additionally, the acrylic resin containing Particle D demonstrates significantly greater hiding performance compared to the diffusion resin containing Particle A (FIG. 4).

Diffusion resins containing Particle C and D maintained spectral uniformity less than 6% while also demonstrating high light transmission and hiding performance greater than or equal to 85% (Examples 3, 4, and 5). Diffusion resins containing Particle B demonstrated spectral uniformity greater than or equal to 6% and hiding performance greater than or equal to 66%. A diffusion resin containing Particle A demonstrated spectral uniformity greater than or equal to 6% and hiding performance 77%. In the case of Particle A, the large size of the particle created a rough surface texture that contributed to increasing the hiding performance.

Examples 8-18

Resin B is the same as Resin A except it does contain a very low level of UV absorbing additive. Resin C is an impact modified acrylic resin that contains UV absorbing additive and has a MFR of 1 g/10 min (measured by ASTM D1238, 230° C./3.8 kg). Resin D is the same as Resin C except it does not contain UV stabilizers.

TABLE 4

Example formulations expressed in weight percent.

| Example ID | Resin B | Resin C | Particle A | Particle B | Particle C |
|---|---|---|---|---|---|
| Example 8 | 98.0% | | 1.8% | | 0.2% |
| Example 9 | 94.2% | | 5.0% | 0.8% | |
| Example 10 | | 82.0% | 18.0% | | |
| Example 11 | | 91.0% | 9.0% | | |
| Example 12 | | 95.5% | 4.5% | | |
| Example 13 | 79.6% | | 18.0% | | 2.4% |

TABLE 5

| | 385 nm | | 400 nm | | 800 nm | | Δ% LT | Δ% LT |
|---|---|---|---|---|---|---|---|---|
| Example ID | % LT | HP | % LT | HP | % LT | HP | (800 nm-400 nm) | (800 nm-385 nm) |
| Example 8 | 77.2 | 86.8 | 84.6 | 86.6 | 85.7 | 77.2 | 1.1 | 8.5 |
| Example 9 | 67.7 | 87.5 | 77.4 | 87.1 | 87.5 | 78.3 | 10.2 | 19.8 |
| Example 10 | 35.6 | 82.2 | 79.2 | 82.0 | 89.6 | 74.6 | 10.4 | 54.0 |
| Example 11 | 37.2 | 66.8 | 85.8 | 66.1 | 92.0 | 54.6 | 6.2 | 54.8 |
| Example 12 | 36.7 | 47.9 | 87.0 | 47.1 | 92.0 | 35.5 | 5.0 | 55.3 |
| Example 13 | 36.1 | 95.4 | 46.7 | 95.4 | 49.5 | 95.2 | 2.7 | 13.4 |

Summarized optical light transmission (% LT), hiding performance (HP), and spectral uniformity (Δ% LT) of 0.080" thick example plaques, measured on a Lambda 950 UV/VIS Spectrophotometer.

TABLE 6

Additional Example formulations expressed in weight percent.

| Example ID | Resin B | Resin C | Resin D | Particle A | Particle B | Particle C | Comments |
|---|---|---|---|---|---|---|---|
| Example 10 | | 82.0% | | 18.0% | | | high % stabilizer #1 |
| Example 14 | | | 82.0% | 18.0% | | | no UV stabilizer |
| Example 15 | | | 82.0% | 18.0% | | | low % stabilizer #2 |
| Example 16 | | | 81.9% | 18.0% | | | high % stabilizer #2 |
| Example 17 | | | 81.9% | 18.0% | | | low % stabilizer #3 |
| Example 18 | | | 80.8% | 18.0% | | | high % stabilizer #3 |

TABLE 7

| | 385 nm | | 400 nm | | 800 nm | | Δ% LT | Δ% LT |
|---|---|---|---|---|---|---|---|---|
| Example ID | % LT | HP | % LT | HP | % LT | HP | (800 nm-400 nm) | (800 nm-385 nm) |
| Example 10 | 35.6 | 82.2 | 79.2 | 82.0 | 89.6 | 74.6 | 10.4 | 54.0 |
| Example 14 | 86.4 | 67.1 | 88.1 | 65.3 | 91.3 | 45.3 | 3.2 | 4.9 |
| Example 15 | 86.9 | 69.1 | 88.5 | 67.6 | 91.0 | 47.1 | 2.5 | 4.1 |
| Example 16 | 87.2 | 68.0 | 88.7 | 66.1 | 90.7 | 45.7 | 2.0 | 3.5 |
| Example 17 | 87.0 | 68.8 | 88.9 | 67.0 | 91.8 | 47.2 | 2.9 | 4.8 |
| Example 18 | 86.7 | 66.9 | 88.7 | 65.0 | 91.5 | 45.4 | 2.8 | 4.8 |

Summarized optical light transmission (% LT), hiding performance (HP), and spectral uniformity (Δ% LT) of 0.080" thick example plaques, measured on a Lambda 950 UV/VIS Spectrophotometer.

The invention claimed is:
1. A light diffusing cover composition for use with two or more point light sources, wherein said light diffusing cover composition comprises:
   a) a transparent or translucent polymer matrix,
   b) 0.1 to 40 weight percent of diffusion particles dispersed within said transparent polymer matrix, and
   c) a UV absorbing additive,
   wherein said light diffusing cover composition has the following properties when measured on a 0.080 inch (0.203 cm) thick sheet:
   a light transmission of greater than 40 percent of light at each of 400 nm, 500 nm, 600 nm, 700 nm, and 800 nm light wavelengths;
   less than a 6 percent absolute difference between the light transmission at 400 nm and the light transmission at 800 nm; and
   a level of diffusion, as measured by hiding performance, of at least 65 percent at each of 400 nm, 500 nm, 600 nm, 700 nm, and 800 nm light wavelengths.
2. The light diffusing cover composition of claim 1, wherein the UV absorbing additive does not absorb wavelengths of light above 390 nm.
3. The light diffusing cover composition of claim 1, wherein said transparent or translucent polymer matrix is selected from the group consisting of polymethylmethacrylate (PMMA), polycarbonate (PC), polyethylene terephthalate, glycol modified (PETG), polyvinyl chloride (PVC), impact modified PVC, polyesters (PET, PBT, APET, etc.), styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, and mixtures thereof.

4. The light diffusing cover composition of claim 1, wherein said matrix polymer is a (meth)acrylic polymer, having at least 70 weight percent of methylmethacrylate monomer units.

5. The light diffusing cover composition of claim 1, wherein said diffusing particles are inorganic, organic or a mixture thereof.

6. The light diffusing cover composition of claim 1, wherein said diffusing particles have a spherical, near spherical or irregular shape, and have a refractive index mis-match with the polymer matrix of +/−0.01 to 0.25.

7. The light diffusing cover composition of claim 1, wherein said diffusing particles have a refractive index that is lower than the refractive index of the polymer matrix.

8. The light diffusing cover composition of claim 1, wherein said diffusion particles have a multi-modal particle size distribution.

9. The light diffusing cover composition of claim 1, wherein said diffusing particles comprise silicon resin, silicon rubber, or a mixture thereof.

10. The light diffusing cover composition of claim 1, further comprising 0-80 weight % impact modifiers.

11. The light diffusing cover composition of claim 1, wherein said composition contains one or more types of light stabilizing compounds, wherein said composition contains less than 1 weight percent light stabilizing compounds that absorb wavelengths of light above 390 nm.

12. A lighting device, comprising two or more point light sources of different wavelengths, and a light diffusing cover made of the light diffusing cover composition of claim 1.

13. The lighting device of claim 12, wherein said light diffusing cover has a thickness of from 200 micrometers to 10 mm.

14. The lighting device of claim 12, wherein said light diffusing cover has a roughened surface.

15. The lighting device of claim 12, wherein said lighting device is selected from the group consisting of a continuous environmental disinfecting luminaire, a multi-color luminaire, a horticultural lighting luminaire, and an interior automotive lighting system.

* * * * *